United States Patent [19]

Schläfer

[11] Patent Number: 4,564,672

[45] Date of Patent: Jan. 14, 1986

[54] WATER-SOLUBLE MONOAZO AND DISAZO COMPOUNDS CONTAINING A FIBRE-REACTIVE 2-ALKOXY-5-CHLORO-ANILINE DIAZO COMPONENT AND COPPER COMPLEXES THEREOF, USEFUL AS DYESTUFFS

[75] Inventor: Ludwig Schläfer, Kelkheim, Fed. Rep. of Germany

[73] Assignee: Hoechst Aktiengesellschaft, Frankfurt, Fed. Rep. of Germany

[21] Appl. No.: 517,806

[22] Filed: Jul. 27, 1983

Related U.S. Application Data

[63] Continuation-in-part of Ser. No. 420,100, Sep. 20, 1982, abandoned, which is a continuation of Ser. No. 338,855, Jan. 12, 1982, abandoned, which is a continuation of Ser. No. 217,525, Dec. 17, 1980, abandoned.

[30] Foreign Application Priority Data

Dec. 19, 1979 [DE] Fed. Rep. of Germany ....... 2951061

[51] Int. Cl.[4] .................. C09B 62/51; C09B 62/513; C09B 62/515; D06B 1/38
[52] U.S. Cl. .................................. 534/629; 534/642; 534/727; 534/736
[58] Field of Search ............... 260/174, 178, 184, 186, 260/187, 188, 189, 190, 191, 195, 196, 197, 198, 199, 200, 201, 202, 203, 204, 205, 206, 207, 207.1, 207.5; 534/629, 642

[56] References Cited

U.S. PATENT DOCUMENTS

| | | | |
|---|---|---|---|
| 3,457,252 | 7/1969 | Meininger et al. | 260/148 |
| 3,523,115 | 8/1970 | Grandjean | 260/153 |
| 4,035,351 | 7/1977 | Schlafer et al. | 260/196 |
| 4,139,527 | 2/1979 | Meininger et al. | 260/199 |
| 4,247,460 | 1/1981 | Hugl et al. | 260/186 |

FOREIGN PATENT DOCUMENTS

| | | | |
|---|---|---|---|
| 1139932 | 11/1962 | Fed. Rep. of Germany | 260/146 |
| 1911427 | 9/1970 | Fed. Rep. of Germany | 260/196 |
| 2344333 | 6/1974 | Fed. Rep. of Germany | 260/190 |

Primary Examiner—Floyd D. Higel

Attorney, Agent, or Firm—Curtis, Morris & Safford

[57] ABSTRACT

New water-soluble azo compounds which have the general formula (1)

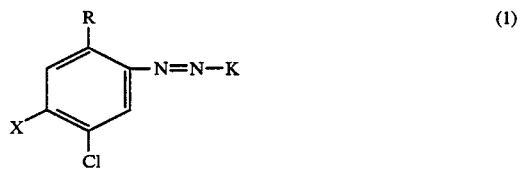

in which K is the radical of a water-soluble coupling component which can couple at one or two positions in the molecule and which belongs to the series comprising aminobenzenes, phenols, naphthols, aminonaphthols, acylaminonaphthols, dihydroxynaphthalenesulfonic acids, phenylazoaminonaphtholsulfonic and naphthylazoaminonaphtholsulfonic acids, 5-pyrazolones and 5-aminopyrazoles and 2-hydroxy-6-pyridones, R represents an alkoxy group of 1 to 4 C-atoms and X a group of the formula $-SO_2-CH=CH_2$ or $-SO_2-CH_2-CH_2-Z$ in which Z is a group which can be eliminated under alkaline conditions, furthermore, the copper complex compounds of the above-mentioned metal-free compounds of the general formula (1). The novel metal-free compounds as well as the copper complex compounds have valuable dyestuff properties and are particularly suitable as fiber-reactive dyestuffs for dyeing and printing materials containing hydroxy or carbonamide groups, preferably fiber materials. The compounds of the invention produce deep dyeings which have very good fastness to nitrogen oxide and excellent fastness to wet processing such as fastness to boiling with sodium carbonate, fastness to washing at 60° to 95° C. and/or with peroxides, fastness to alkaline and acid perspiration, to water (under severe conditions), to alkalis and acids such as tartaric acid, to cross-dyeing, to bleaching with hypochlorite and to chlorinated water. The copper-complex compounds yield dyeings which are especially fast to light.

12 Claims, No Drawings

WATER-SOLUBLE MONOAZO AND DISAZO COMPOUNDS CONTAINING A FIBRE-REACTIVE 2-ALKOXY-5-CHLORO-ANILINE DIAZO COMPONENT AND COPPER COMPLEXES THEREOF, USEFUL AS DYESTUFFS

This U.S. patent application is a continuation-in-part application of U.S. patent application Ser. No. 420,100 filed Sept. 20, 1982, now abandoned, which is a continuation application of U.S. patent application Ser. No. 338,855 filed Jan. 12, 1982, now abandoned, which again was a continuation application of U.S. patent application Ser. No. 217,525 filed Dec. 17, 1980, abandoned.

The present invention relates to the field of water-soluble acid textile dyestuffs, particularly when used as fiber-reactive dyestuffs.

Two azo dyestuffs containing, as coupling components, a 2-aminonaphthalenedisulfonic acid and, as the diazo component, 4-β-sulfatoethylsulfonyl-2-methoxy-5-chloroaniline are already known from the Tabular Examples 26 and 27 of German Offenlegungsschrift No. 2,344,333. These known dyestuffs exhibit certain drawbacks, for example unsatisfactory fastness to light of their dyeings, finished with synthetic resin, on cellulose fibers.

New water-soluble monoazo and diazo compounds which have the general formula (1)

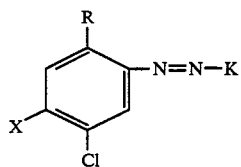

have now been found. In this formula (1), K denotes the radical of a water-soluble coupling compound capable of coupling once or twice, i.e. at one or two positions of the coupling compound, and belonging to the series of aminobenzenes, phenols, particularly the sulfonic acids and carboxylic acids thereof, of naphthols, particularly the sulfonic acids thereof, of aminonaphthols, particularly the sulfonic acids thereof, of acylaminonaphthols, particularly the sulfonic acids thereof (the acyl radical is that of an alkanecarboxylic or alkenecarboxylic acid, each of which has 1 to 4 C atoms in the alkyl or alkenyl radical, or of an aromatic carboxylic acid (such as benzoic acid) or of an aromatic sulfonic acid (such as benzenesulfonic or toluenesulfonic acid) or of N-substituted carbamic acid (such as the N-phenylureido radical)), or to the series of dihydroxynaphthalenesulfonic acids, phenylazoaminonaphtholsulfonic acids and naphthylazoaminonaphtholsulfonic acids, of 5-pyrazolones, of 5-aminopyrazoles, acetoacetylarylides, 2-hydroxy-6-pyridones and hydroxyquinolines; R denotes an alkoxy radical having 1 to 4 C atoms, particularly the methoxy or ethoxy group; and X denotes a radical of the formula (2) or (3)

in which Z denotes a group which can be eliminated under alkaline conditions.

Examples of groups which can be eliminated under alkaline conditions are halogen atoms, such as the chlorine atom and the bromine atom, and ester groups of organic carboxylic and sulfonic acids, such as a lower alkanoyloxy radical, for example the acetoxy radical, or the sulfobenzoyloxy, benzoyloxy, benzenesulfonyloxy or toluenesulfonyloxy radical; further examples are the acid ester groups of phosphoric acid or sulfuric acid corresponding to the formulae, written in the form of the free acids, —OPO$_3$H$_2$ and —OSO$_3$H, respectively, or the radical of thiosulfuric acid of the formula, written in the form of the free acid, —S—SO$_3$H, and also dialkylamino groups containing alkyl groups each of which has 1 to 4 C atoms, such as the dimethylamino group and the diethylamino group, and the hydroxy group.

Furthermore, the copper complex compounds corresponding to the compounds of the general formula (1) have also been found, and of these preferential mention should be made of those which correspond to the general formulae (4a), (4b) and (4c)

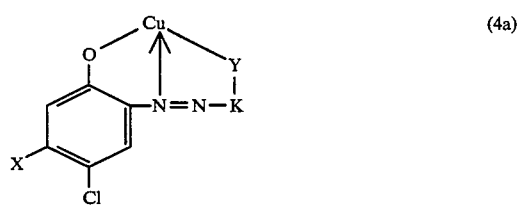

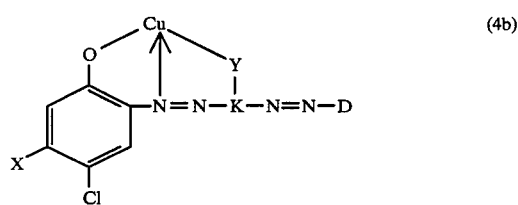

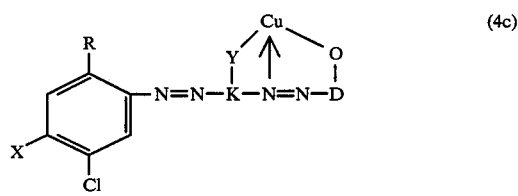

in which X and K have the abovementioned meanings, D denotes a phenyl or naphthyl radical which can be substituted by 1, 2 or 3 substituents belonging to the group comprising chlorine, bromine, alkyl having 1 to 4 C atoms, such as methyl and ethyl, alkoxy having 1 to 4 C atoms, such as methoxy and ethoxy, hydroxy, sulfo, carboxy, carbamoyl and sulfamoyl, preferably chlorine, methyl, methoxy, sulfo and hydroxy, and which is optionally also substituted by a radical corresponding to the moiety X defined above, and Y is a group of the formula —O— or —NH—.

If K is the radical of a coupling component belonging to the naphthol series or the acylaminonaphthol series or the pyrazolone series, it preferably represents the radical of 1-naphthol or 2-naphthol which are substituted by 1, 2 or 3 sulfo groups, respectively the radical of 1-naphthol or 2-naphthol which are substituted by 1 or 2 sulfonic acid groups and by one acetylamino, propionylamino, benzoylamino, benzenesulfonylamino or tosylamino group, respectively the radical of 1-phenyl-5-pyrazolone which is substituted in the 3-position by the methyl, carbomethoxy, carboethoxy or carboxy group and in which the phenyl radical in the 1-position can be substituted by 1 or 2 substituents belonging to the group comprising chlorine, methyl and sulfo.

The compounds according to the invention can exist both in the form of the free acid and in the form of their salts. They are preferably in the form of their salts, particularly their alkali metal and alkaline earth metal salts, particularly their sodium, potassium and also calcium salts.

The new compounds are suitable, preferably in the form of their alkali metal salts, as dyestuffs, preferably for dyeing and printing fiber materials and leather.

The present invention also relates to a process for the manufacture of the compounds of the general formula (1) and copper complexes thereof, particularly those of the general formulae (4).

The compounds of the general formula (1) are prepared by diazotizing an aromatic amine of the general formula (5)

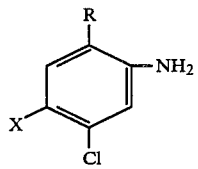

(5)

in which R and X have the abovementioned meanings, in a manner which is in itself customary, and coupling the diazo compound prepared once or twice with a monovalent or divalent coupling component of the general formula (6) or (6a)

H—K (6)

H—K—H (6a)

in which K has the abovementioned meaning. If the coupling component is a compound which can couple at two positions in the molecule corresponding to the above formula (6a), a diazo compound can be prepared by first carrying out, in an acid medium, the coupling with the first mole of the diazonium compound of the amine of the general formula (5) or another aromatic amine of the aniline or naphthylamine series, such as an amine of the general formula (7)

D—NH$_2$ (7)

in which D has the abovementioned meaning, and then carrying out, in a slightly acid, neutral or slightly alkaline range, the second coupling reaction with the second mole of a diazonium compound of an amine of the general formula (5) or an amine of the aniline or naphthylamine series, such as an amine of the general formula (7), but necessarily with the diazonium compound of the amine of the general formula (5) if the first coupling reaction was carried out with the diazonium compound of an amine of the aniline or naphthylamine series, such as an amine of the general formula (7); for example, if the coupling component of the general formula (6a) is an aminonaphthol compound, coupling is performed first at a pH value of about 1 to 2.5 and then at a pH value between 4 and 6.5 and, for example, if the coupling component of the general formula (6a) is a resorcinol compound, coupling is performed first at a pH value between 0.8 and 2 and then at a pH value between 6 and 7.5.

If the radical X in the compound of the general formula (5) represents the β-hydroxyethylsulfonyl group, this hydroxy group of the resulting azo compound can be converted, in a manner which is in itself customary and known, into the corresponding acid ester and acyloxy compounds by means of esterifiying and acylating agents. Examples of such esterifying and acylating agents are organic or inorganic acids and anhydrides thereof or halides and amides of such acids, such as, for example, sulfuric acid, phosphoric acid, acetic anhydride, toluenesulfochloride, thionyl chloride, aminosulfonic acid, mixtures of phosphoric acid and phosphorus pentoxide, or phosphorus oxychloride. Azo compounds according to the invention of the general formula (1) which contain the radical of the formula (3) wherein Z represents an acid ester group or an acyloxy group, can be converted, in a manner which is in itself customary and known, by treatment with an alkali into dyestuffs according to the invention in which X represents the vinylsulfonyl group of the radical (2). Compounds of to the invention containing this vinylsulfonyl group can be converted, in a manner which is in itself customary, by reaction with a dialkylamine, the alkyl radicals of which each have 1 to 4 C atoms, into the corresponding compounds of the invention of the general formula (1) in which X is a radical of the formula (3), wherein Z represents the corresponding dialkylamino group, or can be converted by reaction with an alkali metal salt of thiosulfuric acid, such as sodium thiosulfate, into the dyestuffs of the invention of the general formula (1) in which X is the radical of the formula (3), in which Z represents the thiosulfato group.

The copper complex compounds according to the invention are prepared from the compounds of formula (1) by reaction with a copper-yielding agent by the method of a dealkylating coppering, provided that there is a hydroxy or amino group in K in the ortho-position relative to the azo group. The dealkylating coppering reaction is effected in a manner which is in itself known, such as is described, for example, in Houben-Weyl, Methoden der organischen Chemie (Methods of Organic Chemistry), volume 10/3 (1965), page 455.

The copper complex compounds according to the invention can subsequently be modified in the radical X in a corresponding manner, as described above for the compounds of the general formula (1).

Examples of suitable copper-donating compounds both the simple and complex salts of copper, such as, for example, copper sulfate, copper chloride, copper acetate or copper carbonate, and the copper salts of salicylic acid or tartaric acid.

Examples of compounds according to the invention which can be singled out, are those compounds of the general formula (1) in which K denotes a radical according to the formula (7a), (7b), (7c), (7d), (7e), (7f), (7g), (7h), (7i), (7j), (7k), (7m), (7n), (7p), (7q) or (7r):

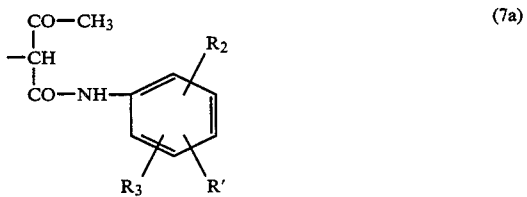

(7a)

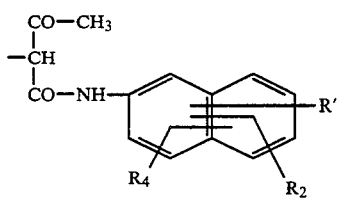 (7b)

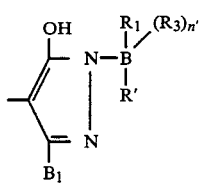 (7c)

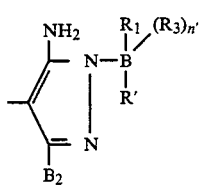 (7d)

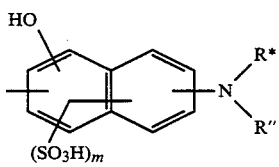 (7e)

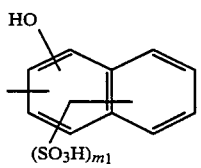 (7f)

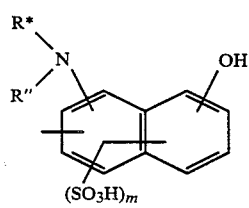 (7g)

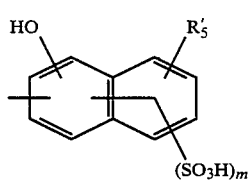 (7h)

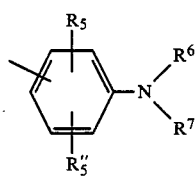 (7i)

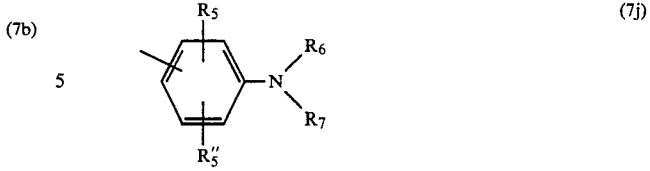 (7j)

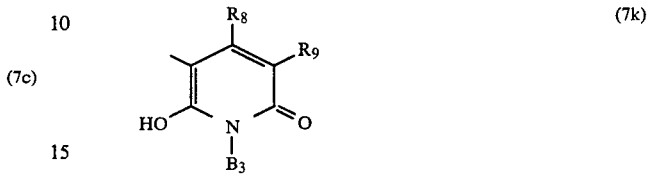 (7k)

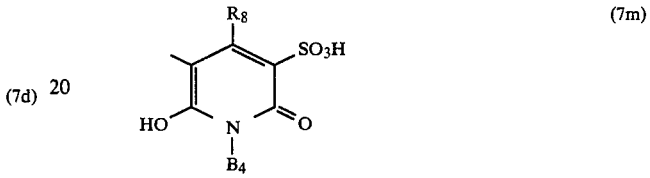 (7m)

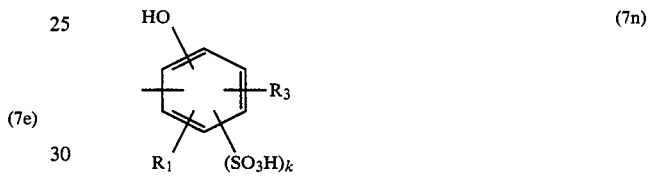 (7n)

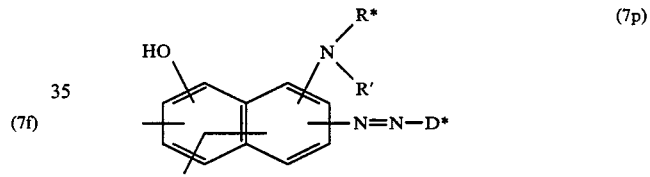 (7p)

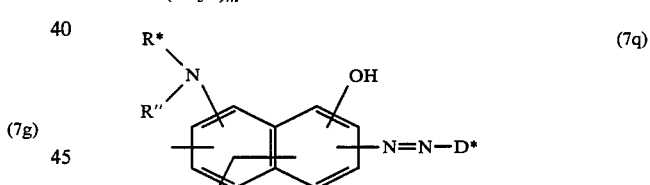 (7q)

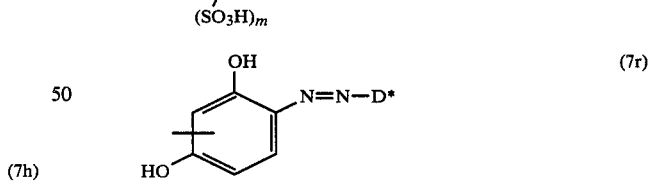 (7r)

In these formulae the symbols have the following meanings: R' is a carboxylic acid or sulfonic acid group; $R_1$ is a hydrogen atom, a lower alkyl group, such as, in particular, a methyl or ethyl group, a lower alkoxy group, such as, in particular, a methoxy or ethoxy group, a chlorine or bromine atom, a lower alkanoylamino group, such as an acetylamino group, or a sulfonic acid group; $R_2$ is a hydrogen atom, a lower alkyl group, such as, in particular, a methyl or ethyl group, a lower alkoxy group, such as, in particular, a methoxy or ethoxy group, a chlorine or bromine atom or a sulfonic acid group; $R_3$ is a hydrogen atom, a lower alkyl group, such as, in particular, the methyl or ethyl group, a lower alkoxy group, such as, in particular, the methoxy or ethoxy group, or a chlorine or bromine atom; $R_4$ is a hydrogen atom, a lower alkyl group, such as, in particular, the methyl or ethyl group, a lower alkoxy group, such as, in particular, the methoxy or ethoxy group, the sulfonic acid group or the carboxylic acid group, it being possible for R', $R_1$, $R_2$, $R_3$ and $R_4$ to be identical or different from one another; n' is the number 1 or 2; B is a benzene or naphthalene nucleus; $B_1$ is a lower alkyl group, preferably a methyl group, a carboxy group, a carbomethoxy or carboethoxy group or the phenyl radical; $B_2$ is a lower alkyl group, preferable the methyl group, a carbomethoxy or carboethoxy group, a carbonamide group or a phenyl radical which can be substituted by 1 or 2 substituents belonging to the group comprising lower alkyl, lower alkoxy, chlorine, bromine and sulfo; R* is a hydrogen atom or a lower alkyl radical; R'' is a hydrogen atom, a lower alkyl radical or a phenyl radical which can be substituted by 1 or 2 substituents belonging to the group comprising lower alkyl, lower alkoxy, chlorine, bromine and sulfo; $R_5'$ is the phenylureido group, a lower alkanoylamino group or lower alkenoylamino group, such as an acetylamino, propionylamino or acryloylamino group, or a benzoylamino group which can be substituted by chlorine, methyl, methoxy, nitro, sulfo and/or carboxy; $R_5$ is a hydrogen atom, a lower alkyl group, such as a methyl or ethyl group, a lower alkoxy group, such as a methoxy or ethoxy group, a chlorine or bromine atom or a sulfonic acid group; $R_5''$ is a hydrogen atom, a lower alkyl group, such as a methyl or ethyl group, or a lower alkoxy group, such as a methoxy or ethoxy group, or a chlorine atom; $R_6$ is a hydrogen atom or a lower alkyl group which can be substituted by a hydroxy, cyano, phenyl, carboxy, sulfo, sulfato, carbomethoxy, carboethoxy or acetoxy group; $R_7$ is a hydrogen atom or a lower alkyl group which can be substituted by a hydroxy cyano, phenyl, carboxy, sulfo, sulfato, carbomethoxy, carboethoxy or acetoxy group, or is a benzyl radical or a phenyl radical ether of which can be substituted by lower alkyl, lower alkoxy, chlorine and/or sulfo; $R^6$ is a hydrogen atom or a lower alkyl group which is substituted by a hydroxy, carboxy, sulfo, sulfato, methoxy or ethoxy group; $R^7$ is a lower alkyl group which is substituted by a hydroxy, carboxy, sulfo, sulfato, methoxy or ethoxy group; $R_8$ is a hydrogen atom or a lower alkyl group, such as the methyl or ethyl group, or a lower alkyl group which is substituted by lower alkoxy or cyano; $R_9$ is a sulfo group or a lower sulfoalkyl group, such as a sulfomethylene group, it being possible for R*, R'', $R_1$, $R_5$, $R_5'$, $R_5''$, $R_6$, $R_7$, $R^6$, $R^7$, $R_8$ and $R_9$ to be identical or different from one another; $B_3$ is a hydrogen atom or a lower alkyl group, such as a methyl or ethyl group, which can be substituted by phenyl or sulfophenyl; $B_4$ is a hydrogen atom, a lower alkyl group, a lower alkyl group which is substituted by lower alkoxy, such as methoxy, or by an acetylamino or benzoylamino group or by a cyano group, a lower alkenyl group, a cyclohexyl group, the phenyl group or a phenyl radical which is substituted by substituents belonging to the group comprising carboxy, sulfo, benzoylamino, acetylamino or chlorine, or an amino group which is substituted by phenyl, lower alkyl, acetyl, benzoyl, hydroxy or methoxy; D* is the radical D defined above or a radical of the formula

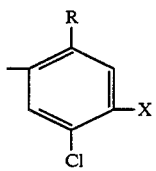

in which R and X have the abovementioned meaning; k is the number zero or 1; m represents the number 1 or 2; and $m_1$ represents the number 1, 2 or 3.

Here, as in the following test, the term "lower" denotes that the alkyl or alkylene radicals or the alkenyl radical contained in the group consists of preferably 1 to 4 C atoms.

The free bond leading to the azo group in the above formulae (7e), (7f), (7g), (7h), (7i), (7j) and (7n), or the azo group in formula (7p) and (7q), is situated in the ortho-position relative to the hydroxy or amino group.

Examples of the copper complex azo compounds of the invention corresponding to the general formulae (4) which can be singled out are those in which the radical K and the radical Y linked thereto denote a radical of the general formula (8a), (8b), (8c), (8d), (8e), (8f) or (8g):

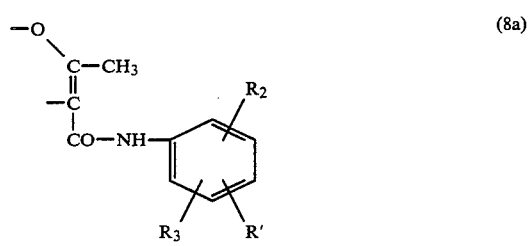

(8a)

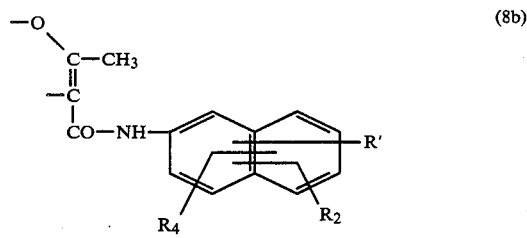

(8b)

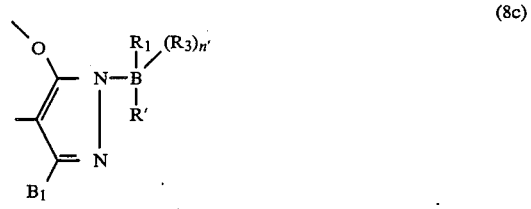

(8c)

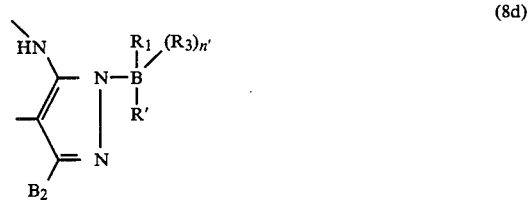

(8d)

-continued

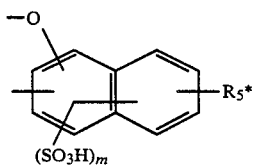 (8c)

In these formulae, R', $R_1$, $R_2$, $R_3$, $R_4$, B, $B_1$, $B_2$, D*, n', m and $m_1$ have the meanings indicated initially, the complex-forming oxygen atoms or amino groups being linked in each case in the ortho-position relative to the azo groups and $R_5^*$ denoting a hydrogen atom or having the above meaning of $R_5'$.

Examples of coupling components of the general formula (6) and (6a), which can be employed for the preparation of the dyestuffs of the invention of the general formula (1) are, in particular, the compounds of the general formulae (9a), (9b), (9c), (9d), (9e), (9f), (9h), (9i), (9j), (9k), (9m), (9n), (9p) and (9q):

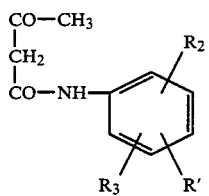 (9a)

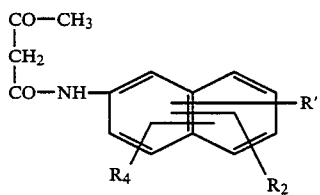 (9b)

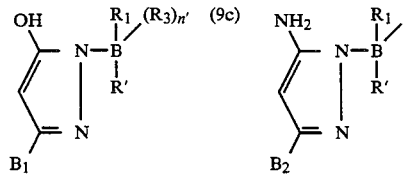 (9c) (9d)

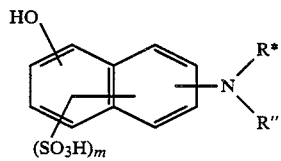 (9e)

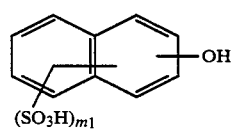 (9f)

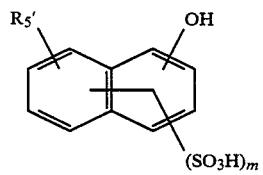 (9h)

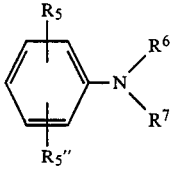 (9i)
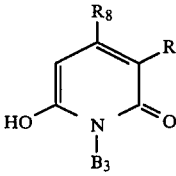 (9j)

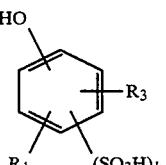 (9k)
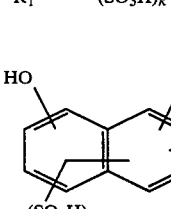 (9m)

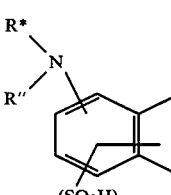 (9n)

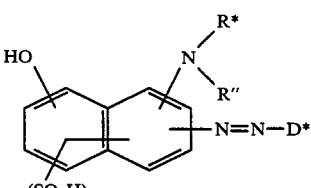 (9p)

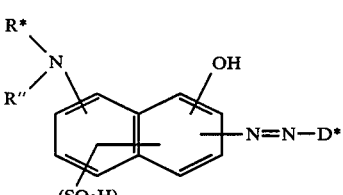 (9q)

in which D*, R', $R_1$, $R_2$, $R_3$, $R_4$, $R_5$, $R_6$, $R_7$, $R^6$, $R^7$, $R_8$, $R_9$, R", $R_5'$, $R_5''$, R*, k, m, $m_1$, n', B, $B_1$, $B_2$, $B_3$ and $B_4$ have the abovementioned meanings.

Examples of coupling components of the general formula (6) and (6a), which contain a hydroxy or amino group capable of forming a copper complex and which can be employed for the preparation of the copper complex compounds according to the invention are, in particular, the abovementioned compounds of the general formulae (9a), (9b), (9c), (9d), (9e), (9f), (9h), (9p) and (9q).

The following are examples of coupling components of the general formula (6) and (6a), which can be used for the preparation of the dyestuffs according to the invention and which correspond, for example, to the general formulae (7a) to (7q): 1,3-diaminobenzene-5-sulfonic acid, phenol, cresol, resorcinol, 2-ethoxyphenol, 4-methylphenol, 3-sulfophenol, salicylic acid, 3-sulfonaphthol, 4-sulfonaphthol, 5-sulfonaphthol, 3,6-disulfonaphth-8-ol, 4,6-disulfonaphth-8-ol, 1-naphthol-3,8-disulfonic acid, 1-aminonaphth-8-ol-4-sulfonic acid, 1-aminonaphth-8-ol-5-sulfonic acid, 1-amino-8-naphthol-2,4-disulfonic acid, 2-amino-5-naphthol-7-sulfonic acid, 2-amino-5-naphthol-1,7-disulfonic acid, 1-amino-5-naphthol-7-sulfonic acid, 2-aminonaphth-8-ol-6-sulfonic acid, 2-amino-8-naphthol-3,6-disulfonic acid, 2-amino-8-naphthol-4,6-disulfonic acid, 1-amino-8-naphthol-3,6- disulfonic acid, 1-amino-8-naphthol-4,6-disulfonic acid, 1-acryloylamino-8-naphthol-3,6-disulfonic acid, 1-acryloylamino-8-naphthol-4,6-disulfonic acid, 1-propionylamino-8-naphthol-3,6-disulfonic acid, 1-acetylamino-8-naphthol-4-sulfonic acid, 1-acetylamino-8-naphthol-3,6-disulfonic acid, 1-acetylamino-8-naphthol-4,6-disulfonic acid, 1-benzoylamino-8-naphthol-3,6-disulfonic acid, 1-benzoylamino-8-naphthol-4,6-disulfonic acid, 2-naphthol-5,7-disulfonic acid, 2-naphthol-3,6-disulfonic acid, 2-naphthol-6,8-disulfonic acid, 1,8-dihydroxynaphthalene-3,6-disulfonic acid, 1,8-dihydroxynaphthalene-6-sulfonic acid, 1-naphthol-3,6,8-trisulfonic acid, 2-acetylamino-5-naphthol-7-sulfonic acid, 2-benzoylamino-8-naphthol-6-sulfonic acid, 2-(p'-tosylamino)-5-naphthol-7-sulfonic acid, 2-acetylamino-8-naphthol-3,6-disulfonic acid, 2-acetylamino-5-naphthol-1,7-disulfonic acid, 2-benzoylamino-8-naphthol-6-sulfonic acid, 2-phenylsulfonylamino-5-naphthol-7-sulfonic acid, 2-(N-methyl-N-acetyl)-amino-8-naphthol-6-sulfonic acid, N-ethyl-N-benzylaniline-3-sulfonic acid, N,N-bis-($\beta$-hydroxyethyl)-aniline, N,N-bis-($\beta$-sulfatoethyl)-aniline, N,N-bis-($\beta$-hydroxyethyl)-2-methoxy-5-chloroaniline, N-($\beta$-sulfatoethyl)-2,5-dimethoxyaniline, N-($\beta$-sulfatoethyl)-2-chloroaniline, acetoacetyl-2-naphthylamide-5-sulfonic acid, N-acetoacetylaniline-3-sulfonic acid, N-acetoacetylaniline-4-sulfonic acid, N-acetoacetyl-2-methoxy-5-sulfoaniline, N-acetoacetyl-4-methoxy-3-sulfoaniline, N-acetoacetyl-2-methoxy-5-methyl-4-sulfoaniline, N-acetoacetyl-2,5-dimethoxy-4-sulfoaniline, 1-(4'-sulfophenyl)-3-methylpyrazol-5-one, 1-(4'-sulfophenyl)-3-carboxypyrazol-5-one, 1-(2'-chloro-5'-sulfophenyl)-3-methylpyrazol-5-one, 1-(2'-chloro-5'-sulfophenyl)-3-carboxypyrazol-5-one, 1-(3'-sulfophenyl)-3-carboxypyrazol-5-one, 1-(2'-methoxy-4'-sulfophenyl)-3-carboxypyrazol-5-one, 1-(3'-sulfophenyl)-3-methyl-5-aminopyrazole, 1-(4'-sulfophenyl)-3-methyl-5-aminopyrazole, 1-(2'-methoxy-5'-sulfophenyl)-3-methyl-5-aminopyrazole, 1-(2'-methoxy-5'-methyl-4'-sulfophenyl)-3-methyl-5-aminopyrazole, 1-(2'-chloro-5'-sulfophenyl)-3-methyl-5-aminopyrazole, 1-(3'-amino-4'-sulfophenyl)-3-carboethoxypyrazol-5-one, 1-(2',4',6'-trimethyl-3'-amino-5'-sulfophenyl)-3-carboethoxypyrazol-5-one, 1-(3'-amino-6'-methylphenyl)-3-carboxypyrazol-5-one, 2-N-methylamino-8-naphthol-6-sulfonic acid, 3-carboxypyrazol-5-one, 1-phenyl-3-carboxypyrazol-5-one, 1-(4'-nitrophenyl)-3-carboxypyrazol-5-one, 1-(3'-acetylaminophenyl)-3-carboxypyrazol-5-one, 1-(3'-carboxyphenyl)-3-methylpyrazol-5-one, 2,3-hydroxynaphthoic acid, 8-hydroxyquinoline-5-sulfonic acid, 1,4-dimethyl-2-hydroxy-6-pyridone-5-sulfonic acid, aniline-N-methanesulfonic acid, 2-amino-5-naphthol-7-sulfonic acid, 2-methylamino-8-naphthol-6-sulfonic acid, diphenylamino-2,5-disulfonic acid and diphenylamino-4'-sulfonic acid.

Among the compounds, according to the invention, of the general formula (1), compounds which can be mentioned as being preferred are those in which the radical K has the following meaning: K, as the radical of a water-soluble coupling component, represents the 1-naphthol or 2-naphthol radical which is substituted by 1, 2 or 3 sulfonic acid groups and can also be substituted by 1 amino, methylamino, phenylamino, acetylamino, benzoylamino or N-methyl-N-acetylamino group, or K, as the radical of a water-soluble coupling component, denotes the 5-aminopyrazole or 5-pyrazolone radical which is substituted in the 3-position by methyl, carboxy, carbamoyl, lower carboalkoxy, such as carbomethoxy and carboethoxy, or phenyl and contains the phenyl nucleus or naphthyl nucleus linked in the 1-position, it being possible for the phenyl radical to be substituted by 1 or 2 sulfonic acid groups and/or 1 or 2 substituents belonging to the group comprising lower alkyl, lower alkoxy, chlorine, bromine, nitro, acetylamino and carboxy, and for the naphthyl nucleus to be substituted by 1, 2 or 3 sulfo groups and/or a substituent belonging to the group comprising lower alkyl, lower alkoxy, nitro, acetylamino and carboxy, or K, as the radical of a water-soluble coupling component, represents the acetoacetylanilide or acetoacetylnaphthylamide radical wherein the phenyl radical or the naphthyl radical is substituted by one or two sulfonic acid and/or carboxylic acid groups and can also be substituted by 1 or 2 substituents belonging to the group comprising lower alkyl, such as methyl and ethyl, lower alkoxy, such as methoxy and ethoxy, carboxy, acetylamino, benzoylamino, carbamoyl, carbamoyl which is monosubstituted or disubstituted by lower alkyl and/or phenyl, sulfamoyl, sulfamoyl which is monosubstituted or disubstituted by lower alkyl and/or phenyl, cyano, nitro, chlorine, bromine, trifluoromethyl and sulfo, or K, as the radical of a water-soluble coupling component, represents the aniline radical, which can be substituted in the benzene nucleus by 1 or 2 substituents belonging to the group comprising lower alkyl, lower alkoxy, sulfo and chlorine and which is monosubstituted or disubstituted on the nitrogen atom of the aniline by lower alkyl, the(se)lower alkyl group(s) being substituted by a carboxy, sulfo, hydroxy or sulfato group, and the azo group on K being in the ortho-position relative to the hydroxy group which directs the coupling or in the ortho-position or para-position relative to the amino group which directs the coupling.

Examples of the copper complex compounds, according to the invention, of the general formulae (4) which can be mentioned as preferred are those compounds in which Y represents an oxygen atom and K has the following meaning: K is the naphthylene radical which is substituted by 1, 2 or 3 sulfonic acid groups and can also be substituted by 1 amino, methylamino, phenylamino, acetylamino, benzoylamino or N-methyl-N-acetylamino group, or K is the radical of pyrazol-4,5-ylene which is substituted in the 3-position by methyl, carboxyl, carbamoyl, lower carboalkoxy, such as carbomethoxy and carboethoxy, or phenyl, and which is substituted in the 1-position by the phenyl or a naphthyl wherein the phenyl radical is substituted by or 2 sulfonic acid groups and/or carboxylic acid groups and can also be substituted by 1 or 2 substituents belonging to the group comprising lower alkyl, lower alkoxy, chlorine, bromine, nitro and acetylamino, and the naphthyl radical is substituted by 1, 2 or 3 sulfo groups and/or carboxylic acid groups and can also be substituted by a substituent belonging to the group comprising lower alkyl, lower alkoxy, nitro and acetylamino, or K is the coupling radical of acetoacetylanilide or acetoacetylnaphthylamide, wherein the phenyl or naphthyl radical is substituted by 1, 2 or 3 sulfonic acid and/or carboxylic acid groups and can also be substituted by 1 or 2 substituents belonging to the group comprising lower alkyl, such as methyl and ethyl, lower alkoxy, such as methoxy and ethoxy, carboxy, acetylamino, benzoylamino, carbamoyl, carbamoyl which is monosubstituted or disubstituted by lower alkyl and/or phenyl, sulfamoyl, sulfamoyl which is monosubstituted or disubstituted by lower alkyl and/or phenyl, cyano, nitro, chlorine, bromine and trifluoromethyl.

The compounds according to the invention can be isolated from the solutions in which they were synthesized, by methods which are generally known for water-soluble compounds, for example by precipitation from the reaction medium by means of an electrolyte, such as, for example, sodium chloride or potassium chloride, or else by evaporating the reaction solution itself, for example by spray drying. If the last-mentioned method of isolating the compounds according to the invention is chosen, it is frequently advisable, before the evaporation, to remove any quantities of sulfate which may be present in the solutions, by precipitation in the form of calcium sulfate and separation by filtration. In some cases, the aqueous solution of the compound according to the invention, if appropriate after adding a buffer substance, can also be used direct as a liquid preparation, for example for dyeing or printing a fiber material.

The metal-free compounds and copper complex compounds according to the invention possess valuable dyestuff properties. They are therefore suitable for use as water-soluble dyestuffs for dyeing leather or materials composed of natural, regenerated or synthetic nitrogen-containing fibers or composed of natural, regenerated or synthetic fibers containing hydroxy groups. The fiber-reactive radical in the compounds according to the invention has the property of entering into a covalent bond with NH and OH groups—preferably in the alkaline range in the case of the hydroxy groups—and thus of producing a real bond with the fiber.

The present invention therefore also relates to the use of the compounds according to the invention for dyeing (including printing) materials composed of natural, regenerated or synthetic nitrogen-containing fibers or natural, regenerated or synthetic fibers containing hydroxy groups, or leather, respectively to a process for dyeing (including printing) such materials (substrates), in which a compound according to the invention is applied to the substrate, preferably from an aqueous solution, and is fixed on the substrate, if appropriate under the action of an alkali and heat.

Examples of nitrogen-containing fiber materials are fibers composed of synthetic polyurethanes or polyamides, such as polyamide-6,6, polyamide-6, polyamide-11 and polyamide-4; natural fiber materials composed of polyamides are silk and wool and other types of animal hair.

Fiber materials containing hydroxy groups are, in particular, cellulose fiber materials, preferably cotton and other vegetable fibers, such as linen, hemp, jute, and also the corresponding fibers made from regenerated cellulose, such as, for example, viscose or cuprammonium rayon.

The compounds according to the invention can be applied to the substrates mentioned by the application techniques which are generally known for fiber-reactive dyestuffs. Thus the procedure generally followed is to apply the compounds according to the invention to the substrate in aqueous solution, if appropriate in the presence of a customary thickener and/or, if appropriate, other auxiliaries which can improve, for example, the affinity, the levelling capacity and the migration capacity, it being possible for the aqueous solution of the compound according to the invention to be adjusted to be slightly acid, neutral or alkaline.

On natural, regenerated or synthetic polyamide fibers or polyurethane fibers or on leather, the compounds according to the invention are applied to the fiber in a customary manner from an aqueous slightly acid to neutral solution (pH range say between 3 and 6.5), preferably in accordance with the methods of the exhaustion process, and are fixed on the fiber by the action of heat, particularly at a temperature between 60° and 130° C.

Thus, for example, acetic acid or acetic acid and ammonium acetate as a buffer can be added to the bath containing the compound according to the invention, in order to maintain the pH value desired. In order to achieve serviceable evenness in the dyeings, it is advisable to add customary levelling agents, for example levelling agents based on a reaction product of cyanuric chloride with three times the molar amount of an aminobenzenesulfonic acid and/or aminonaphthalenesulfonic acid and/or levelling agents based on a reaction product of stearylamine with ethylene oxide. The compound according to the invention can be applied to, and fixed on, the substrate in accordance with the exhaustion process either at the boiling point or at a higher temperature, such as, for example, 105° to 120° C., under pressure, and it is appropriate to begin the dyeing while increasing the temperature slowly, first to 60° C., and after some time slowly to a higher temperature.

When dyeing fiber materials containing hydroxy groups, the compound according to the invention is generally applied to the fiber from a neutral to alkaline solution and is fixed on the fiber in the presence of an alkaline agent which, if necessary, is subsequently added to the aqueous solution or is applied to the fiber.

Dyed (or printed) fiber materials which have good fastness to wet processing are obtained in this way.

In detail, the procedure followed can be in accordance with customary methods for applying fiber-reactive dyestuffs and fixing the latter on the fiber, methods which are described in great numbers in the literature, for example in the following manner: fiber materials containing hydroxy groups, such as, for example, cellulose, are dyed by padding the material with a solution of the compound according to the invention and, if necessary after intermediate drying of the padded material, over-padding the latter with an alkaline solution or passing it through an alkaline bath; these alkaline solutions can be at room temperature or at a higher temperature, for example a temperature between 15° and 80° C.

Examples of substances with an alkaline reaction which can be used in these fixing solutions are sodium hydroxide, sodium carbonate, sodium bicarbonate, potassium hydroxide, potassium carbonate, disodium hydrogen phosphate, trisodium phosphate or sodium silicate or potassium silicate (waterglass). The goods which have been treated with alkali in this way are then either put aside at a temperature between 20° and 50° C. (for example plaited down or wound on a beam) and are left there for several hours in order to fix the compound according to the invention, or are then exposed to the action of moist or dry heat (for example by means of superheated steam, hot air or infra-red radiation) in order to fix the compound according to the invention. If fixing is carried out by heat, it is also possible to employ as alkalis compounds which only achieve their alkaline action under hot conditions, such as, for example, sodium acetate, sodium formate and sodium trichloroacetate.

However, it is also possible for the alkaline agents to be already added to the aqueous dyestuff solution. In this case the fiber material is treated in the aqueous alkaline solution containing the compound according to the invention, advantageously with the addition of an electrolyte, such as sodium chloride or sodium sulfate, at elevated temperatures, such as, for example, a temperature between 30° and 110° C., and it is advantageous to begin the treatment of the fiber while slowly increasing the temperature of the exhaustion bath to 60° C. and then to continue and complete the fixing at temperatures of up to 110° C. It is also possible to pretreat the fiber, such as, for example, the cellulose fiber, with a solution of a compound having an alkaline reaction and then, if appropriate after intermediate drying, to impregnate the fiber with the aqueous solution of the compound according to the invention and subsequently to fix the fiber-reactive compound on the fiber at room temperature, preferably, however, while applying a heat treatment.

If the compounds according to the invention are applied to the fiber material in the form of printing pastes, it is customary to use thickeners, such as sodium alginate, locust bean flour ethers, cellulose ethers, tragacanth or gum arabic, if appropriate adding a customary printing auxiliary and the above compounds with an alkaline reaction. These prints are then treated (thermofixed) with hot air or steamed at a temperature between 70° and 230° C., preferably between 100° and 150° C. Thus it is possible to apply the compounds according to the invention to the cellulose fiber by means of the printing paste in accordance with the customary printing processes, in a one-stage process in the presence of sodium bicarbonate or another of the abovementioned alkaline agents, and then to fix the compound according to the invention by steaming at 101° to 103° C., or, employing a two-stage process, first to apply the compounds according to the invention to the fiber by means of a neutral or slightly acid printing paste, after which they are then fixed on the fiber either by passing the printed material through a hot alkaline bath containing an electrolyte or by over-padding the printed material with an alkaline liquor containing an electrolyte and subsequently leaving the printed material to stand or subjecting it to a heat treatment. If an alkaline bath containing an electrolyte is used, through which the material impregnated with the compound according to the invention is passed in order to achieve fixing, a temperature of 60° to 105° C. is employed for the bath, so that it is possible to dispense with a subsequent treatment with hot air or steam. If the material impregnated with the compound according to the invention is treated with a strong aqueous alkali, such as, for example, sodium hydroxide or potassium hydroxide or sodium silicate or potassium silicate or trisodium phosphate, a prolonged dwell time at room temperature of the moist goods, preferably prints, which have been impregnated with alkali is sufficient to fix the compounds according to the invention.

The dyed materials thus obtained are then subjected to a heat treatment, rinsed and dried in a customary manner. The dyeings and prints obtained in this way using the compounds according to the invention have a very good fastness to nitrogen oxide and exhibit excellent fastness to wet processing of which special mention should be made, for example, of fastness to boiling with sodium carbonate, fastness to washing at 60° to 95° C., fastness to washing with peroxides, such as, for example, washing at 95° C., fastness to alkaline and acid perspiration, to water (under severe conditions), to alkalis and to acids, such as to tartaric acid, to cross-dyeing, to bleaching with hypochlorite and to chlorinated water. In particular, the fastness to light of the dyeings produced using the copper complex compounds of the general formula (4) is remarkably good, whether the substrate is in a dry or moist state. The good fastness to light is also retained if the dyeings on cellulose fibers are finished with a synthetic resin; no saddening of the shade is found. In addition, the prints obtained using the dyestuffs according to the invention exhibit great sharpness of outline and very high clarity of the white ground. The metal-free compounds and copper complex compounds according to the invention possess, in general, a very good affinity and build-up capacity and a high degree of fixing. They are fixed in the same intensity on the different fiber materials of a cotton/staple rayon mixed fabric; thus they exhibit a uniform shade and depth of color on these fiber materials.

The examples which follow serve to illustrate the invention. The parts indicated in these examples are parts by weight and the percentages refer to percent by weight, unless there is a note to the contrary. The ratio between parts by volume and parts by weight is the same as that between liters and kilograms.

EXAMPLE 1

7 parts of sodium nitrite are added to a neutral solution of 34.6 parts of 2-methoxy-5-chloro-4-8β-sulfatoethylsulfonyl)-aniline in 200 parts of water; this solution is poured into a mixture of 35 parts of concentrated hydrochloric acid and 100 parts of ice, while stirring well. Stirring is continued for a further 30 minutes and the excess nitrite is then removed by means of amidosulfonic acid. 36.1 parts of 1-acetylamino-8-naphthol-3,6-disulfonic acid are introduced into this suspension of the diazonium salt and the pH value of the coupling mixture is gradually adjusted to 6 in the course of about 1 hour. Stirring is continued until the completion of the coupling reaction and the resulting azo compound is precipitated with potassium chloride and is isolated by filtering or evaporating (for example spray drying) the solution, after the solution has previously been clarified, if necessary. This gives a blue-red powder containing, besides electrolyte (mainly potassium chloride), the alkali metal salt, mainly the potassium salt, of the compound of the formula

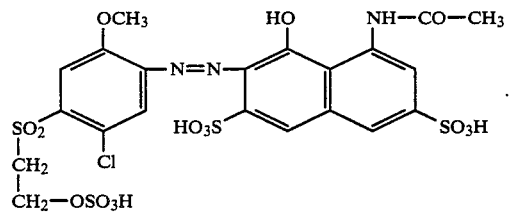

This compound is excellently suitable as a dyestuff for dyeing cellulose fibers and natural and synthetic polyamide fibers, such as cotton, staple rayon, linen, wool, polyamide 6 and polyamide 6,6. On cellulose fiber material in particular, it produces, when applied and fixed by the procedures customary for reactive dye-stuffs, deeply colored prints and dyeings having a wine-red shade and very good fastness to wet processing, such as very good fastness to washing at temperatures between 40° and 95° C., fastness to washing with peroxides, fastness to water (under severe conditions), fastness to alkaline and acid perspiration and fastness to chlorinated water, and also good fastness to exhaust gases and good fastness to light on dry and moist fiber material. Imparting a synthetic resin finish to the dyed fiber materials does not affect either the shade or the fastness to light of the dyeing. The prints which can be obtained using the dyestuff according to the invention exhibit great sharpness of outline and a clear white ground. The dyestuff exhibits a very good build-up capacity.

EXAMPLE 2

71.8 parts of the azo compound of Example 1 are dissolved in 600 parts of water; 40 parts of crystalline sodium acetate, 27 parts of glacial acetic acid and 35 parts of hydrated copper-II sulfate containing water are added to this solution. This reaction mixture is heated to the boil and is kept at this temperature, while stirring, for 2 to 5 hours, the pH value being maintained between 3.5 and 4.5. The reaction mixture is then clarified (for example by filtration, if necessary after adding a little kieselguhr or active charcoal) and the resulting copper complex azo compound is isolated by evaporation, spray drying or salting out. This gives a black-blue powder which contains electrolyte and the alkali metal salt of the compound of the formula

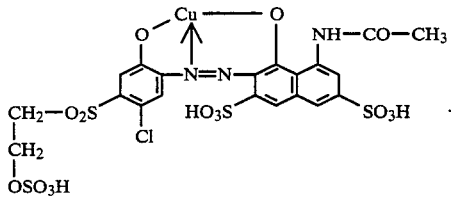

This copper complex compound is excellently suitable as a dyestuff for dyeing cellulose fiber materials and natural and synthetic polyamide fiber materials, such as cotton, staple rayon, linen, wool and polyamide 6, and on these fiber materials, particularly on the cellulose fiber materials, produces using the procedures customary for reactive dyestuffs, violet dyeings or prints which have very good fastness to washing at 40°-95° C., very good fastness to washing with peroxides, fastness to water (under severe conditions), fastness to alkaline and acid perspiration, fastness to chlorinated water and fastness to exhaust gases. The affinity of this copper complex dyestuff and its color build-up and also the fastness to light of dyeings made with it on dry and moist fiber material are outstanding.

EXAMPLE 3

100 parts of ice and 30 parts of concentrated hydrochloric acid are added to a neutral solution of 34.6 parts of 2-methoxy-5-chloro-4-($\beta$-sulfatoethylsulfonyl)-aniline in 200 parts of water and diazotization is carried out with 14 parts of a 40% strength aqueous solution of sodium nitrite; this diazotization mixture is stirred for a further hour and excess nitrite is then removed with amidosulfonic acid. 47.3 parts of 1-(p-toluenesulfonylamino)-8-naphthol-3,6-disulfonic acid are introduced and the pH value is adjusted to 5 to 6 for the purpose of coupling. After the completion of the coupling reaction, the solution is clarified and the azo compound is isolated in a customary manner. This gives a violet powder containing electrolyte and the alkali metal salt of the compound of the formula

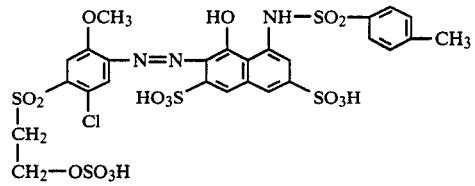

This compound is suitable, and has good application properties, when using application and fixing methods customary for fiber-reactive dyestuffs, as a dyestuff for producing violet dyeings and prints which have good fastness properties on the fiber materials mentioned in the description.

EXAMPLE 4

An equivalent amount of copper-II hydroxycarbonate is added to a neutral solution of the azo compound of Example 3 and the pH value is adjusted to 4.5 by means of sodium acetate and acetic acid. This mixture is heated at the boil for 3 to 6 hours while maintaining this pH value by means of the sodium acetate/glacial acetic acid buffer. The hot reaction mixture is then clarified and the filtrate is evaporated to dryness. This gives a blue-black powder of the alkali metal salt of the compound of the formula

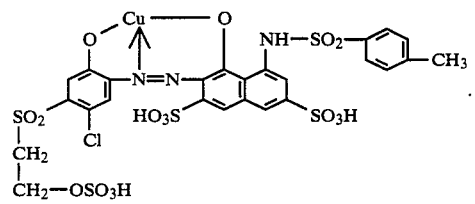

This compound exhibits very good dyestuff properties and produces, in a manner analogous to that described for the dyestuff of Example 1, dyeings and prints which have good technical properties in use and good fastness properties.

EXAMPLE 5

168 parts of 2-ethoxy-5-chloro-4-($\beta$-hydroxyethylsulfonyl)-aniline are dissolved in 1,800 parts of water, 210 parts of concentrated hydrochloric acid are added to the solution and the latter is cooled to 0°-5° C. and diazotized by adding 120 parts of an aqueous 5N solution of sodium nitrite. A solution of 134.4 parts of 1-naphthol-4-sulfonic acid in 1,200 parts of water is added to this diazonium salt suspension and the coupling reaction is carried out at a pH value of 6-7 by adding about 54 parts of a concentrated solution of sodium hydroxide. The resulting azo compound is precipitated by adding a little sodium chloride; this gives a powder containing, in addition to a little electrolyte (sodium chloride), the sodium salt of the compound of the formula

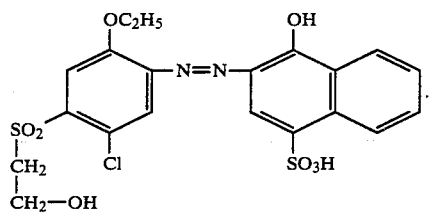

103 parts of this azo compound are dissolved in 100 parts of concentrated sulfuric acid at 20°–25° C., while stirring. After the material has dissolved, the reaction mixture is poured onto a mixture of 500 parts of ice and water and the compound is salted out with sodium chloride and is filtered off. The moist filter cake is suspended in 400 parts of water, the pH value is adjusted to 5 with sodium carbonate and the solution is clarified and evaporated to dryness (for example by spray drying). This gives a powder containing, besides electrolyte, the sodium salt of the compound of the formula

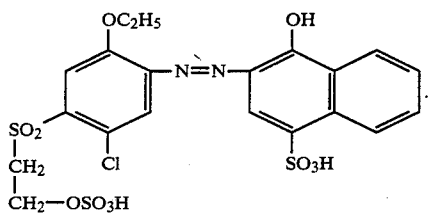

This azo compound containing the sulfatoethylsulfonyl group is a very good fiber-reactive dyestuff which dyes materials made of cellulose fibers and synthetic and natural polyamide fibers, such as cotton, linen, wool, silk and polyamide 6, in luminous scarlet shades. Its dyeings and prints possess the good to very good stability to manufacturing processes and fastness properties mentioned in Example 1.

EXAMPLE 6

The pH value of an aqueous solution of the β-sulfato-ethylsulfonylazo compound of Example 5 is adjusted to 11–12 with concentrated sodium hydroxide solution and the mixture is stirred for 30 minutes at a temperature of 20° C., while maintaining this pH value. The pH value is then re-adjusted to 6 by means of acid and the azo compound is isolated by salting out with sodium chloride. It is filtered off and dried at 80°–100° C. The resulting powder containing, besides electrolyte, the alkali metal salt (sodium salt) of the compound of the formula

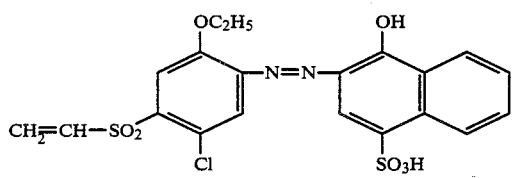

possesses very good dyestuff properties. It produces, particularly using the application and fixing methods customary for reactive dyestuffs on cellulose fiber material, dyeings and prints which have the good technological properties and fastness properties mentioned for the dyestuffs according to the invention.

EXAMPLE 7

An equivalent amount of diethylamine is added to an aqueous solution of the vinylsulfonylazo compound of Example 6 which has a pH value of 6; this reaction solution is stirred for several hours at 20°–25° C. The pH is then adjusted to a value of 5–6 with aqueous hydrochloric acid and the azo compound is salted out with sodium chloride. After about 3 hours, the compound which has been precipitated is filtered off and dried under reduced pressure. This gives a powder containing electrolyte together with the alkali metal salt (sodium salt) of the compound of the formula

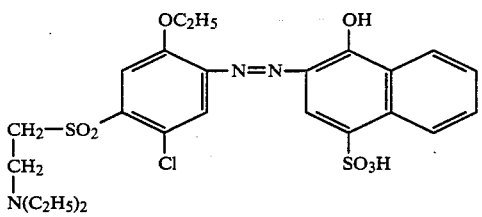

which also exhibits very good dyestuff properties and produces dyeings and prints in a luminous scarlet which have the fastness properties mentioned in Example 5. The padding liquors and printing pastes of this dyestuff, containing electrolyte and alkali, exhibit a high degree of stability.

EXAMPLE 8

An equivalent amount of sodium thiosulfate is added to an aqueous solution of the vinylsulfonylazo compound of Example 6 which has a pH value of 5–6 and the mixture is stirred for 6 hours at 60°–65° C. The pH value is kept at 5–6 by adding acetic acid. The solution is then clarified while hot and spray dried. This gives a red powder containing electrolyte together with the sodium salt of the compound of the formula

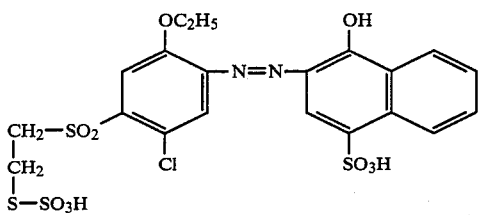

This compound also possesses good dyestuff properties and dyes cellulose fiber materials and natural polyamide fiber materials, using customary dyeing procedures, such as are described, in particular, for dyestuffs having a β-thiosulfatoethylsulfonyl group, to give the good properties which are described for the dyestuff of Example 5.

EXAMPLE 9

51.5 parts of the azo compound containing the β-hydroxyethylsulfonyl group which was prepared in Example 5 are introduced, in the course of one hour, into a mixture of 50 parts of polyphosphoric acid containing 84–85% of $P_2O_5$ and 10 parts of an 80% strength orthophosphoric acid at a temperature of 130° C., while stirring; this reaction solution is stirred for a further 2 hours at this temperature and is then poured slowly into 150 parts of water and stirred in this mixture for a further 2 hours at 80°–90° C. The phosphoric acid ester azo compound thus prepared is salted out with potassium chloride and is filtered off. The moist filter cake is then dissolved in 200 parts of water and the solution is neutralized with sodium carbonate and spray dried. This gives the alkali metal salt of the compound of the formula

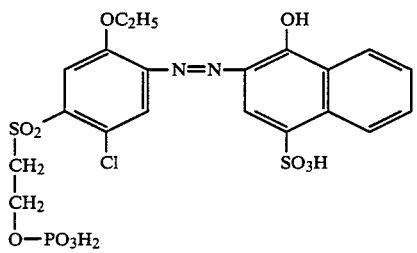

which exhibits very good dyestuff properties and dyes cellulose fiber materials and polyamide fiber materials in scarlet shades using the application processes customary for reactive dyestuffs. The salt possesses the same excellent stability to manufacturing processes and fastness properties as the β-sulfatoethylsulfonyl dyestuff described in Example 5. The padding liquors and printing pastes of this phosphato compound, containing salt and alkali, exhibit a high degree of stability.

EXAMPLE 10

14 parts of an aqueous 40% strength sodium nitrite solution are added to a solution of 36 parts of 2-ethoxy-5-chloro-4-(β-sulfatoethylsulfonyl)-aniline in 200 parts of water which has a pH value of 7. A mixture of 100 parts of ice and 30 parts of concentrated hydrochloric acid are then added to this solution and this diazotization batch is stirred for about 30 minutes. Excess nitrite is destroyed for means of aminosulfonic acid. 25.4 parts of 1-(4'-sulfophenyl)-3-methyl-5-pyrazolone are introduced, the pH value is adjusted to 4 and the coupling mixture is stirred for about 1 hour more. The resulting solution is clarified and the azo compound is isolated in a customary manner (evaporation or salting out). This gives a dark brown powder containing, besides electrolyte, the alkali metal salt of the compound of the formula

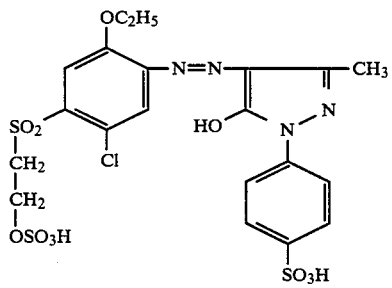

which possesses very good dyestuff properties. Using the application and fixing methods customary for reactive dyestuffs, this compound produces, on cellulose and polyamide fiber material, deeply colored prints and dyeings with a clear reddish-tinged yellow shade which have the very good stability to manufacturing processes and fastness properties mentioned for the dyestuff of Example 1; the dyestuff also exhibits a very good color build-up.

EXAMPLE 11

31.3 parts of the sulfatoethylsulfonylazo compound of Example 10 are dissolved in 300 parts of water and 20 parts of crystalline sodium acetate, 14 parts of glacial acetic acid and 15 parts of hydrated copper-II sulfate are added; the mixture is stirred under reflux for six hours at a pH value of 4–4.5. The hot reaction mixture is then clarified and the azo compound is isolated and dried in a customary manner. A black-brown powder is obtained containing, besides electrolyte, the fiber-reactive copper complex compound of the formula

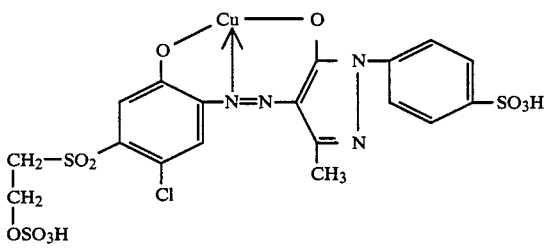

(in the form of the alkali salt), which possesses good dyestuff properties and produces, for example on cotton, strong dyeings and prints which have a yellow-tinged brown color and very good stability to manufacturing processes and fastness properties, of which the outstanding fastness to light on dry and moist fiber material, including material having a synthetic resin finish, should be singled out particularly.

EXAMPLES 12 TO 58

The azo compounds, according to the invention, of the general formula (1) or the copper complexes thereof of the general formula (4), which are characterised by means of their diazo and coupling components in the tabular examples which follow, can also be prepared in a manner according to the invention, for example in accordance with the procedures of the above illustrative embodiments, by reacting the diazonium compound of the amine of the formula (5) listed in the tabular example, with the coupling component of formula (6) listed in the tabular example, and, if appropriate, by a subsequent dealkylating coppering reaction. These fiber-reactive azo compounds according to the invention, and the copper complex compounds thereof, possess very good dyestuff properties and produce, on the fiber materials mentioned in the description, particularly on cellulose fiber materials, using the application and fixing methods customary for fiber-reactive dyestuffs, dyeings and prints which have very good technological properties and fastness properties.

| Example | Diazo component: compound of the general formula (5) | Coupling component: compound of the general formula (6) | Color shade of the dyeing produced by the azo compound of the general formula (1) | the copper complex compound of the general formula (4) |
|---|---|---|---|---|
| 12 | 2-methoxy-5-chloro-4-(β-sulfatoethyl-sulfonyl)-aniline | 1-acetylamino-8-naphthol-4,6-disulfonic acid | bluish-tinged red | violet |
| 13 | 2-methoxy-5-chloro-4-(β-sulfatoethyl-sulfonyl)-aniline | 2-acetylamino-8-naphthol-6-sulfonic acid | red | violet |
| 14 | 2-methoxy-5-chloro-4-(β-sulfatoethyl-sulfonyl)-aniline | 2-acetylamino-7-naphthol-5-sulfonic acid | orange | bluish-tinged red |
| 15 | 2-methoxy-5-chloro-4-(β-sulfatoethyl-sulfonyl)-aniline | 2-acetylamino-8-naphthol-3,6-disulfonic acid | bluish-tinged red | violet |
| 16 | 2-methoxy-5-chloro-4-(β-sulfatoethyl-sulfonyl)-aniline | 1-amino-8-naphthol-2,4-disulfonic acid | violet | navy blue |
| 17 | 2-methoxy-5-chloro-4-(β-sulfatoethyl-sulfonyl)-aniline | 1-amino-8-naphthol-3,6-disulfonic acid (coupled under neutral conditions) | violet | navy blue |
| 18 | 2-methoxy-5-chloro-4-(β-sulfatoethyl-sulfonyl)-aniline | 1-amino-8-naphthol-4,6-disulfonic acid (coupled under neutral conditions) | violet | navy blue |
| 19 | 2-methoxy-5-chloro-4-(β-sulfatoethyl-sulfonyl)-aniline | 1-phenylureido-8-naphthol-3,6-disulfonic acid | bluish-tinged red | violet |
| 20 | 2-methoxy-5-chloro-4-(β-sulfatoethyl-sulfonyl)-aniline | 1-naphthol-3-sulfonic acid | orange | bluish-tinged red |
| 21 | 2-methoxy-5-chloro-4-(β-sulfatoethyl-sulfonyl)-aniline | 1-naphthol-4-sulfonic acid | red | violet |
| 22 | 2-methoxy-5-chloro-4-(β-sulfatoethyl-sulfonyl)-aniline | 2-naphthol-5-sulfonic acid | red | violet |
| 23 | 2-methoxy-5-chloro-4-(β-sulfatoethyl-sulfonyl)-aniline | 2-naphthol-6-sulfonic acid | red | violet |
| 24 | 2-methoxy-5-chloro-4-(β-sulfatoethyl-sulfonyl)-aniline | 2-naphthol-8-sulfonic acid | red | violet |
| 25 | 2-methoxy-5-chloro-4-vinylsulfonyl-aniline | 1-acetylamino-8-naphthol-3,6-disulfonic acid | bluish-tinged red | violet |
| 26 | 2-methoxy-5-chloro-4-vinylsulfonyl-aniline | 1-benzoylamino-8-naphthol-3,6-disulfonic acid | bluish-tinged red | violet |
| 27 | 2-methoxy-5-chloro-4-vinylsulfonyl-aniline | 1-phenylureido-8-naphthol-3,6-disulfonic acid | bluish-tinged red | violet |
| 28 | 2-methoxy-5-chloro-4-vinylsulfonyl-aniline | 1-phenylureido-8-naphthol-4,6-disulfonic acid | bluish-tinged red | violet |
| 29 | 2-methoxy-5-chloro-4-vinylsulfonyl-aniline | 1-naphtol-3,6-disulfonic acid | red | violet |
| 30 | 2-methoxy-5-chloro-4-vinylsulfonyl-aniline | 1-naphthol-3,6,8-tri-sulfonic acid | red | violet |
| 31 | 2-methoxy-5-chloro-4-vinylsulfonyl-aniline | 2-naphthol-3,6-disulfonic acid | red | violet |
| 32 | 2-methoxy-5-chloro-4-vinylsulfonyl-aniline | 2-naphthol-6,8-disulfonic acid | orange | brown |
| 33 | 2-methoxy-5-chloro-4-(β-diethylamino-ethylsulfonyl)-aniline | 1-acetylamino-8-naphthol-3,6-disulfonic acid | bluish-tinged red | violet |
| 34 | 2-methoxy-5-chloro-4-(β-diethylamino-ethylsulfonyl)-aniline | 1-acetylamino-8-naphthol-4,6-disulfonic acid | bluish-tinged red | violet |
| 35 | 2-methoxy-5-chloro-4-(β-diethylamino-ethylsulfonyl)-aniline | 1-naphthol-3,6-disulfonic acid | red | violet |
| 36 | 2-methoxy-5-chloro-4-(β-diethylamino- | 2-naphthol-3,6-disulfonic acid | red | violet |

-continued

| | | | Color shade of the dyeing produced by | |
|---|---|---|---|---|
| Example | Diazo component: compound of the general formula (5) | Coupling component: compound of the general formula (6) | the azo compound of the general formula (1) | the copper complex compound of the general formula (4) |
| 37 | 2-methoxy-5-chloro-4-(β-thiosulfato-ethylsulfonyl)-aniline | 1-acetylamino-8-naphthol-3,6-disulfonic acid | bluish-tinged red | violet |
| 38 | 2-methoxy-5-chloro-4-(β-thiosulfato-ethylsulfonyl)-aniline | 1-naphthol-4-sulfonic acid | red | violet |
| 39 | 2-ethoxy-5-chloro-4-(β-phosphato-ethylsulfonyl)-aniline | 1-acetylamino-8-naphthol-3,6-disulfonic acid | bluish-tinged red | voilet |
| 40 | 2-ethoxy-5-chloro-4-(β-phosphato-ethylsulfonyl)-aniline | 1-acetylamino-8-naphthol 4,6-disulfonic acid | bluish-tinged red | violet |
| 41 | 2-ethoxy-5-chloro-4-(β-phosphato-ethylsulfonyl)-aniline | 2-acetylamino-8-naphthol-6-sulfonic acid 6-sulfonic acid | bluish-tinged red | violet |
| 42 | 2-ethoxy-5-chloro-4-(β-phosphato-ethylsulfonyl)-aniline | 1-naphthol-5-sulfonic acid | red | violet |
| 43 | 2-methoxy-5-chloro-4-(β-sulfatoethyl-sulfonyl)-aniline | 1-benzoylamino-8-naphthol-4,6-disulfonic acid | bluish-tinged red | violet |
| 44 | 2-methoxy-5-chloro-4-(β-sulfatoethyl-sulfonyl)-aniline | acetoacetylaniline-3-sulfonic acid | yellow | yellowish-tinged brown |
| 45 | 2-methoxy-5-chloro-4-(β-sulfatoethyl-sulfonyl)-aniline | 1-(4'-sulfophenyl)-3-methyl-5-pyrazolone | yellow | yellowish-tinged brown |
| 46 | 2-methoxy-5-chloro-4-(β-sulfatoethyl-sulfonyl)-aniline | 1-(4'-sulfophenyl)-5-pyrazolone-3-carboxylic acid | yellow | yellowish-tinged brown |
| 47 | 2-methoxy-5-chloro-4-(β-sulfatoethyl-sulfonyl)-aniline | 1-(4'-sulfophenyl)-3-carbo-ethoxy-5-pyrazolene | yellow | yellowish-tinged brown |
| 48 | 2-methoxy-5-chloro-4-(β-sulfatoethyl-sulfonyl)-aniline | 1-(2'chloro-5'-sulfo-phenyl)-3-methyl-5-pyrazolone | yellow | yellowish-tinged brown |
| 49 | 2-methoxy-5-chloro-4-(β-sulfatoethyl-sulfonyl)-aniline | 1-(2',5'-disulfophenyl)-3-methyl-5-pyrazolone | yellow | yellowish-tinged brown |
| 50 | 2-methoxy-5-chloro-4-(β-sulfatoethyl-sulfonyl)-aniline | 1-(4',8'-disulfonaphth-2-yl)-3-methyl-5-pyrazolone | yellow | yellowish-tinged brown |
| 51 | 2-methoxy-5-chloro-4-(β-sulfatoethyl-sulfonyl)-aniline | 1-(4'sulfophenyl)-3-methyl-5-aminopyrazole | yellow | — |
| 52 | 2-methoxy-5-chloro-4-(β-sulfatoethyl-sulfonyl)-aniline | 8-hydroxyquinoline-5-sulfonic acid | orange | red-brown |
| 53 | 2-methoxy-5-chloro-4-(β-sulfatoethyl-sulfonyl)-aniline | acetoacetylaniline-2-carboxylic acid | yellow | — |
| 54 | 2-methoxy-5-chloro-4-(β-sulfatoethyl-sulfonyl)-aniline | 1,4-dimethyl-2-hydroxy-pyrid-6-one-5-sulfonic acid | yellow | yellowish-tinged brown |
| 55 | 2-methoxy-5-chloro-4-(β-sulfatoethyl-sulfonyl)-aniline | N—ethyl-N—(3'-sulfobenzyl)-aniline | orange | — |
| 56 | 2-methoxy-5-chloro-4-(β-sulfatoethyl-sulfonyl)-aniline | N,N—bis-(hydroxyethyl)-aniline | orange | — |
| 57 | 2-methoxy-5-chloro-4-(β-sulfatoethyl-sulfonyl)-aniline | N,N—bis-(β-sulfatoethyl)-aniline | orange | — |
| 58 | 2-methoxy-5-chloro-4-(β-sulfatoethyl-sulfonyl)-aniline | diphenylamine-4-sulfonic acid | orange | — |

EXAMPLE 59

34.6 parts of 2-methoxy-5-chloro-4-(β-sulfatoethylsulfonyl)-aniline are diazotized in a customary manner, for example as described in Example 1, and 14.4 parts of 1-amino-8-naphthol-3,6-disulfonic acid are then added to the suspension of the diazonium salt; stirring is continued for a further 6 hours in an acid medium in order to complete the coupling reaction. The pH is then adjusted to a value of 6 with sodium carbonate and stirring is continued for a further hour, in the course of which the second coupling reaction takes place. The disazo compound thus prepared is isolated in a customary manner (salting out or evaporating or spray drying the clarified solution). A black powder is obtained containing, besides electrolyte, the alkali metal salt of the compound of the formula

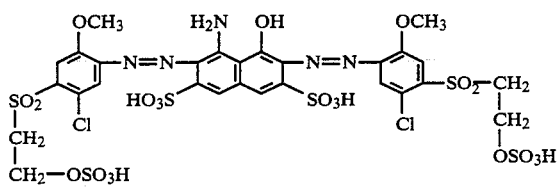

This disazo compound is very suitable as a dyestuff; on cellulose fiber materials and similarly on polyamide fiber materials, it produces, particularly using customary processes for applying and fixing reactive dyestuffs, deeply colored, greenish-tinged black dyeings and prints which have good fastness properties, such as good fastness to washing at 40°–95° C., good fastness to washing with peroxides, fastness to water (under severe conditions), fastness to alkaline and acid perspiration, fastness to chlorinated water, fastness to exhaust gases and good fastness to light on dry and moist fiber material.

EXAMPLE 60

A diazonium salt suspension is prepared from 18 parts of 2-ethoxy-5-chloro-4-(β-sulfatoethylsulfonyl)-aniline, in accordance with the instructions of Example 10, and 14.4 parts of 1-amino-8-naphthol-4,6-disulfonic acid are added; the coupling mixture is stirred for a further 5–6 hours in an acid medium. A diazonium salt solution is then prepared in a customary manner from 8.7 parts of 1-aminobenzene-2-sulfonic acid, this solution is added to the solution of the monoazo compound which has been prepared, and the second coupling is carried out after adjusting the pH to a value of 5–6 and maintaining this pH value for several hours, while stirring. The disazo compound thus obtained can be isolated by a customary route (by salting out or spray drying the previously clarified solution). A black powder is obtained containing, besides electrolyte, the alkali metal salt of the compound of the formula

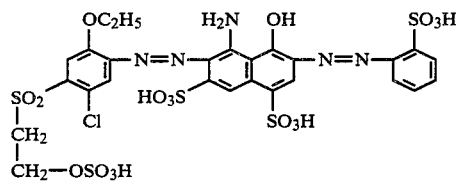

This disazo compound is very suitable as a dyestuff for dyeing cellulose fiber materials and materials made of natural and synthetic polyamide fibers. Using the application and fixing processes customary for fiber-reactive dyestuffs, this dyestuff produces prints and dyeings in strong, greenish-tinged black shades which have very good fastness properties, such as are mentioned, for example, in the present description or in Example 1.

EXAMPLE 61

70 parts of concentrated aqueous hydrochloric acid and 100 parts of ice are added to a neutral solution of 30.3 parts of 2-naphthylamine-4,8-disulfonic acid in 250 parts of water. 14 parts of an aqueous 40% strength solution of sodium nitrite are added, while stirring, and the mixture is then stirred for a further hour; excess nitrite is removed with amidosulfonic acid. 11.2 parts of resorcinol are then added and the coupling mixture is stirred in an acid medium for 6 to 8 hours at 10°–25° C., the temperature is then raised to 45° C. and stirring is continued at this temperature for a further 4 to 6 hours. The pH of the reaction mixture is then adjusted to a value of 6–7 with about 250 parts of concentrated sodium hydroxide solution. An acid diazonium salt suspension, prepared in accordance with Example 1, from 34.6 parts of 2-methoxy-5-chloro-4-(β-sulfatoethylsulfonyl)-aniline is added to the solution of the azo compound which has just been prepared and has been cooled to 0°–10° C. The pH is adjusted to a value of 6–7 with sodium carbonate in order to carry out the second coupling reaction, and the mixture is stirred for a further 10 hours until diazonium salt can no longer be detected. 25 parts of crystalline copper-II sulfate are then added to the solution of the disazo compound thus prepared, and the pH of the solution is adjusted to a value of 5 by means of glacial acetic acid and/or sodium acetate. The dealkylating coppering reaction is carried out under reflux for 3 to 6 hours, while stirring. The reaction mixture is then clarified and the copper complex disazo compound is isolated by a conventional route. A black-brown powder is obtained containing, besides electrolyte, the alkali metal salt of the copper complex compound which has the probable structure

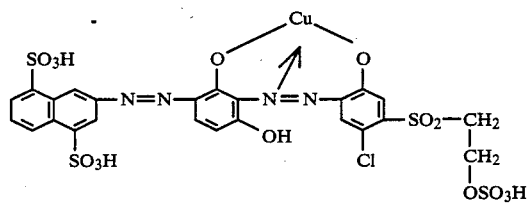

This copper complex disazo compound is very suitable as a dyestuff and produces, on fiber materials made of cellulose or natural and synthetic polyamides, using the dyeing methods customary for fiber-reactive dyestuffs, deep dyeings and prints with a red-brown shade and good to very good stability in manufacturing processes and fastness properties.

We claim:

1. A water-soluble monoazo or disazo compound of the formula (written in the form of the free acid)

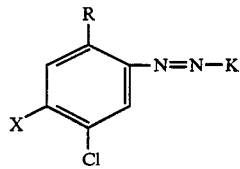

in which
R is alkoxy of 1 to 4 carbon atoms,
X is vinylsulfonyl or beta-sulfatoethylsulfonyl or beta-thiosulfatoethylsulfonyl, and
K is a group of the formula

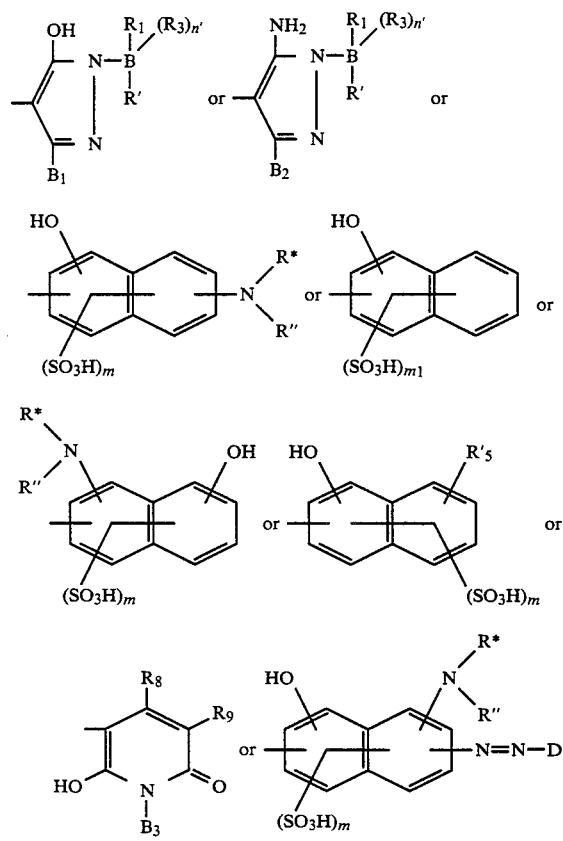

in which
R' is carboxy or sulfo,
$R_1$ is hydrogen, lower alkyl, lower alkoxy, chlorine, bromine, lower alkanoylamino or sulfo,
$R_3$ is hydrogen, lower alkyl, lower alkoxy, chlorine or bromine,
$R'_5$ is phenylureido, lower alkanoylamino, lower alkenoylamino, benzoylamino or benzoylamino substituted by substituents selected from the group consisting of chlorine, methyl, methoxy, nitro, sulfo and carboxy,
$R_8$ is hydrogen, cyano, lower alkyl or lower alkyl substituted by lower alkoxy,
$R_9$ is sulfo or lower sulfoalkyl,
R'' is hydrogen, lower alkyl, phenyl or phenyl substituted by 1 or 2 substituents selected from the group consisting of lower alkyl, lower alkoxy, chlorine, bromine and sulfo,
R* is hydrogen or lower alkyl, B is a benzene or naphthalene ring,
$B_1$ is lower alkyl, carboxy, carbomethoxy, carboethoxy or phenyl,
$B_2$ is lower alkyl, carbomethoxy, carboethoxy, carbonamide, phenyl or phenyl substituted by 1 or 2 substituents selected from the group consisting of lower alkyl, lower alkoxy, chlorine, bromine and sulfo,
$B_3$ is hydrogen, lower alkyl or lower alkyl substituted by phenyl or sulfophenyl,
m is 1 or 2,
$m_1$ is 1, 2 or 3,
n' is 1 or 2, and
D* is a group of the formula

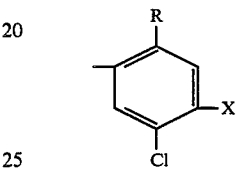

wherein R and X are defined as above.

2. A water-soluble copper-complex compound of the monoazo or disazo compound of the formula (written in the form of the free acid)

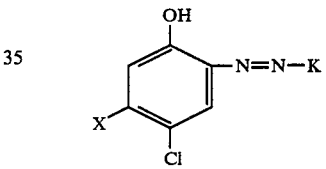

in which X is vinylsulfonyl or beta-sulfatoethylsulfonyl or beta-thiosulfatoethylsulfonyl, and
K is a group of the formula

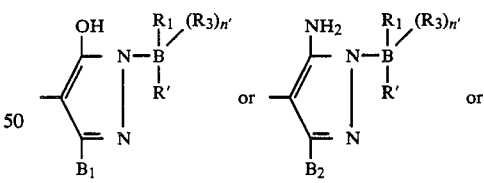

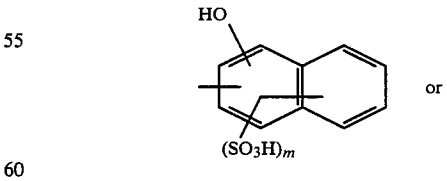

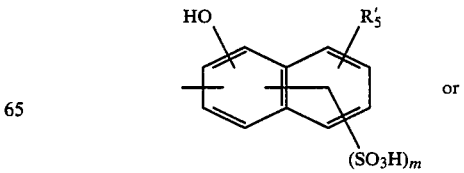

-continued

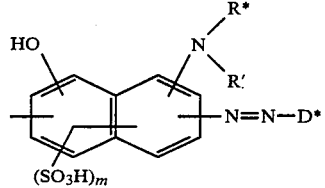

in which
R' is carboxy or sulfo,
R₁ is hydrogen, lower alkyl, lower alkoxy, chlorine, bromine, lower alkanoylamino or sulfo,
R₃ is hydrogen, lower alkyl, lower alkoxy, chlorine or bromine,
R'₅ is phenylureido, lower alkanoylamino, lower alkenoylamino, benzoylamino or benzoylamino substituted by substituents selected from the group consisting of chlorine, methyl, methoxy, nitro, sulfo and carboxy,
R'' is hydrogen, lower alkyl, phenyl or phenyl substituted by 1 or 2 substituents selected from the group consisting of lower alkyl, lower alkoxy, chlorine, bromine and sulfo,
R* is hydrogen or lower alkyl,
B is a benzene or naphthalene ring,
B₁ is lower alkyl, carboxy, carbomethoxy, carboethoxy or phenyl,
B₂ is lower alkyl, carbomethoxy, carboethoxy, carbonamide, phenyl or phenyl substituted by 1 or 2 substituents selected from the group consisting of lower alkyl, lower alkoxy, chlorine, bromine and sulfo,
m is 1 or 2,
m₁ is 1, 2 or 3,
r' is 1 or 2, and
D* is a group of the formula

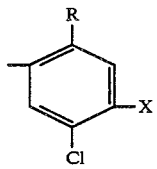

wherein R and X are defined as above.

3. A disazo compound according to claim 1 of the formula (written in the form of the free acid)

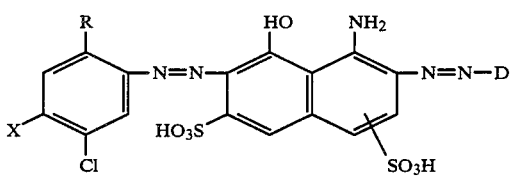

in which
D is phenyl or naphthyl each of which is unsubstituted or substituted by 1, 2 or 3 substituents selected from the group consisting of chlorine, bromine, alkyl of 1 to 4 C-atoms, alkoxy of 1 to 4 C-atoms, hydroxy, sulfo, carboxy, carbamoyl and sulfamoyl, and unsubstituted or substituted by the group X, and
R and X are defined as in claim 1.

4. A copper complex compound according to claim 2 of the formula

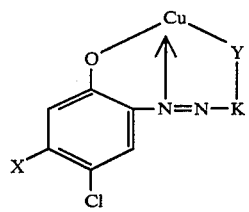

in which
Y is a group of the formula —O— or —NH— and
K is a group of the formula

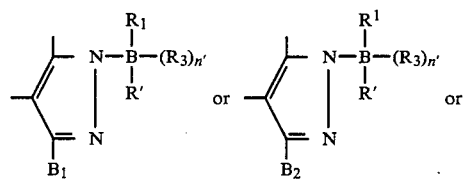

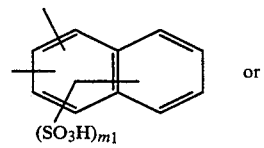

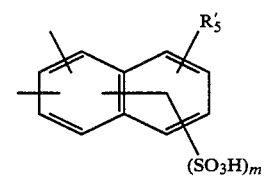

in which B, B₁, B₂, R₁, R₃, R', m, m₁ and n' are defined as in claim 2.

5. A disazo compound according to claim 3, wherein D is phenyl or naphthyl, each of which is unsubstituted or substituted by 1, 2 or 3 substituents selected from the group consisting of chlorine, methyl, methoxy, sulfo and hydroxy, or is the group of the formula

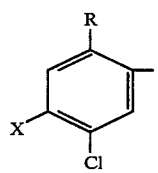

in which R and X are defined as in claim 3.

6. A monoazo compound according to claim 1, wherein R is methoxy, X is β-sulfatoethylsulfonyl or vinylsulfonyl and K is 1-hydroxy-4-sulfonaphth-2-yl, 1-hydroxy-3,6-disulfonaphth-2-yl, 1-hydroxy-8-acetylamino-3,6-disulfonaphth-2-yl, 1-(4'-sulfophenyl)-3-methylpyrazol-5-on-4-yl or 1-(4'-sulfophenyl)-3-carboxypyrazol-5-on-4-yl.

7. A disazo compound according to claim 1 of the formula (written in the form of the free acid)

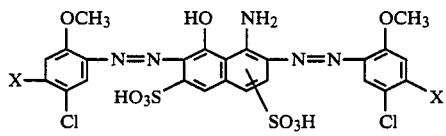

wherein X is vinylsulfonyl or β-sulfatoethylsulfonyl.

8. A copper-complex compound according to claim 1, in which D is phenyl or naphthyl, each of which is unsubstituted or substituted by 1, 2 or 3 substituents selected from the group consisting of chlorine, methyl, hydroxy, methoxy and sulfo, and K, Y, and X are defined as in claim 1.

9. A compound according to claim 1, in which K is a group of the formula

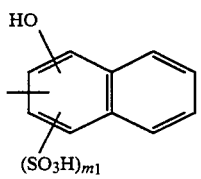

in which $m_1$ as well as R and X are defined as in claim 1.

10. A compound according to claim 1, in which X is vinylsulfonyl or beta-sulfatoethylsulfonyl.

11. A compound according to claim 2, in which X is vinylsulfonyl or beta-sulfatoethylsulfonyl.

12. A copper complex compound according to claim 2 of the formula

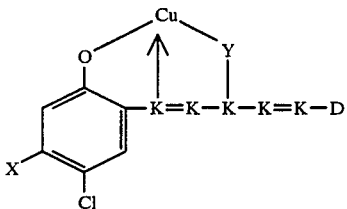

in which
D is phenyl or naphthyl each of which is unsubstituted or substituted by 1, 2, or 3 substituents selected from the group consisting of chlorine, bromine, alkyl of 1 to 4 C-atoms, alkoxy of 1 to 4 C-atoms, hydroxy, sulfo, carboxy, carbamoyl and sulfamoyl, and unsubstituted or substituted by the group X,
X is defined as in claim 2,
Y is a group of the formula —O— or —NH—, and
K is a group of the formula

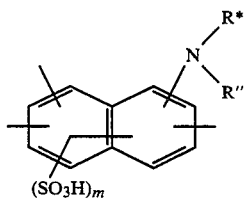

in which R*, R" and m are defined as in claim 2.

* * * * *

UNITED STATES PATENT AND TRADEMARK OFFICE
CERTIFICATE OF CORRECTION

PATENT NO. : 4,564,672

DATED : January 14, 1986

INVENTOR(S) : Schlafer

It is certified that error appears in the above-identified patent and that said Letters Patent is hereby corrected as shown below:

Column 31, line 37, "r'" should be --n'--;

Column 33, line 10, (Claim 8, line 2), "1" should be --12--;

Column 33, line 15, (Claim 8, line 6), "1" should be --4--.

Signed and Sealed this

Twenty-second Day of July 1986

[SEAL]

Attest:

DONALD J. QUIGG

Attesting Officer

Commissioner of Patents and Trademarks